Aug. 11, 1931.　　　J. M. MANN　　　1,818,807
VARIABLE SPEED REDUCER
Filed Feb. 12, 1930　　　4 Sheets-Sheet 1

Aug. 11, 1931.    J. M. MANN    1,818,807
VARIABLE SPEED REDUCER
Filed Feb. 12, 1930    4 Sheets-Sheet 2

Inventor
John M. Mann
By Mason Fenwick & Lawrence
Attorneys

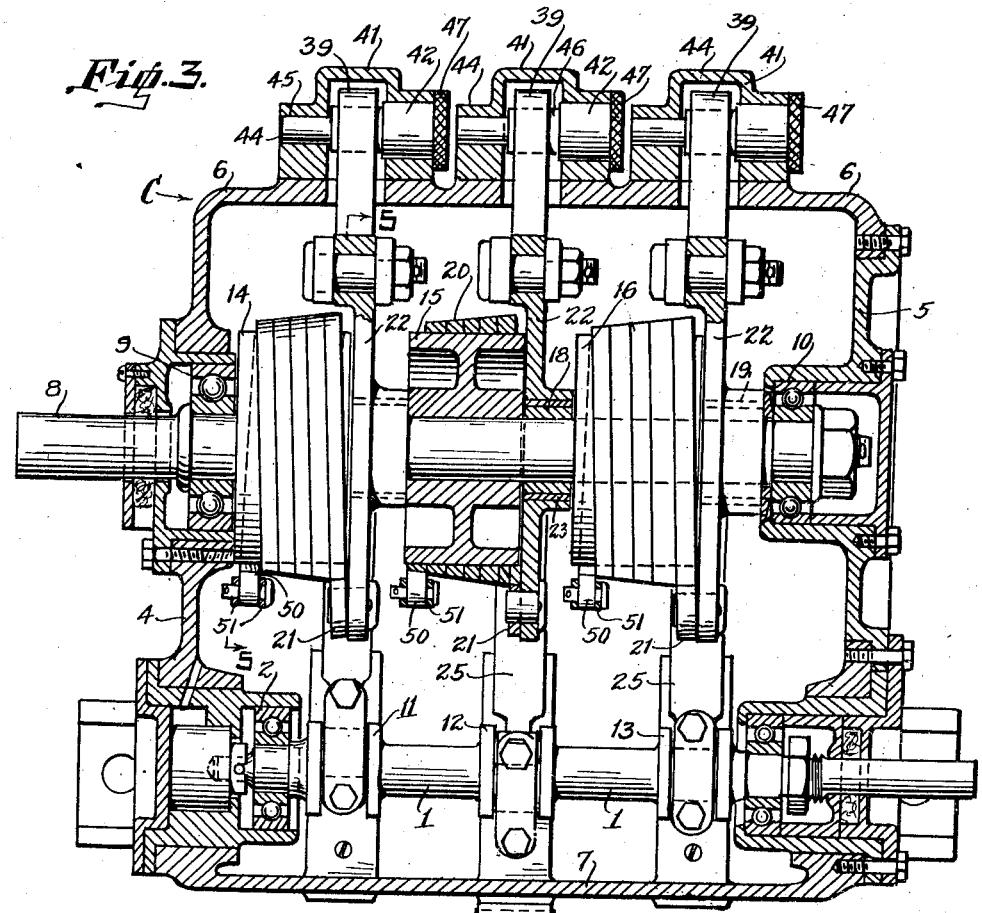

Aug. 11, 1931.　　　J. M. MANN　　　1,818,807
VARIABLE SPEED REDUCER
Filed Feb. 12, 1930　　　4 Sheets-Sheet 4
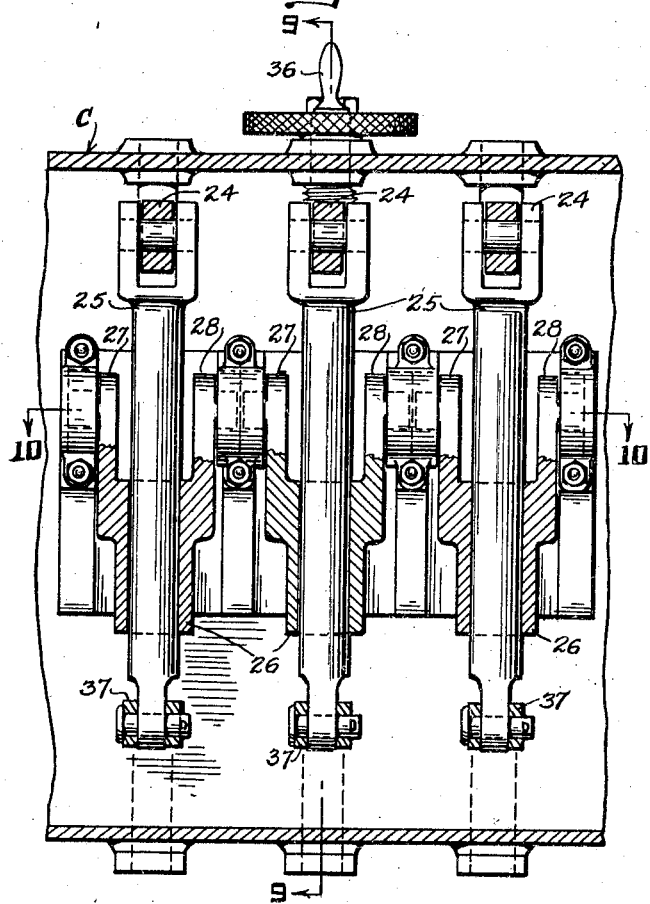
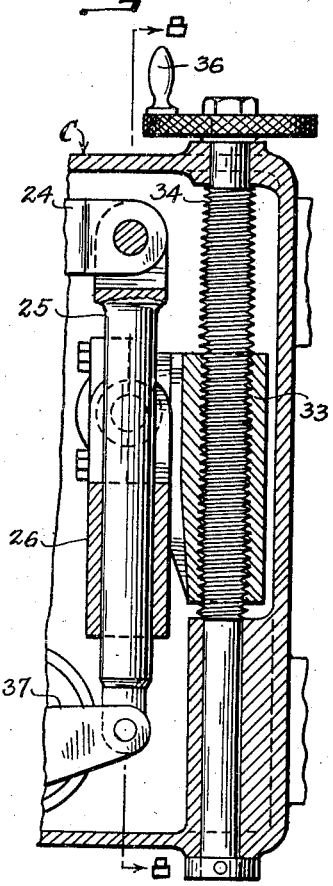
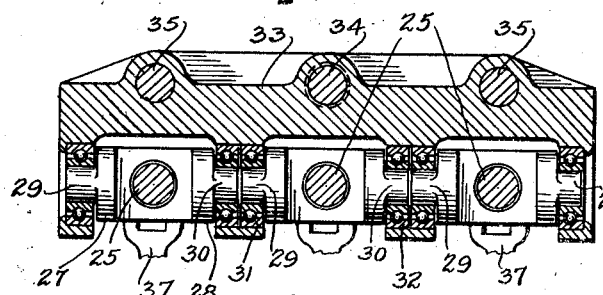
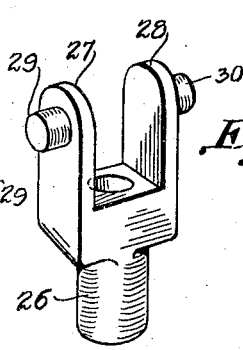
Inventor
John M. Mann
By Mason Fenwick & Lawrence
Attorneys Patented Aug. 11, 1931

1,818,807

UNITED STATES PATENT OFFICE

JOHN M. MANN, OF PHILADELPHIA, PENNSYLVANIA

VARIABLE SPEED REDUCER

Application filed February 12, 1930. Serial No. 427,977.

The invention forming the subject matter of this application relates to improvements in speed changing devices for varying the speed of a driven shaft controlled by the continuously rotating driver shaft.

The main object of the invention is to provide a device of this kind, by which the driven shaft may be varied through any desired degree without stopping the rotation of the driver shaft, and without involving changes in the mechanism connecting the two shafts.

Primarily, the invention is designed for reducing the speed of a prime mover (such as an electric motor, steam turbine, or other power developing apparatus), as transmitted to a driven shaft to provide for the accomplishment of certain classes of work in a manner more efficient than can be effected by direct drive of the prime mover.

Another object of the invention is to provide a device for reducing the speed of the prime mover to a rate determined as the most efficient and economical and with a minimum loss of power.

Other objects of the invention will become apparent as the detailed description thereof proceeds.

In the drawings:

Fig. 3 is a section taken on the line 3—3 of Fig. 1;

Fig. 4 is a fragmentary horizontal section taken on the line 4—4 of Fig. 1;

Fig. 5 is a fragmentary detail, partly in elevation, and partly in section, illustrating the opposite side of a coil grip shown in Fig. 1;

Fig. 8 is a vertical transverse section taken on the line 8—8 of Fig. 9;

Fig. 9 is a vertical section taken on the line 9—9 of Fig. 8;

Fig. 10 is a horizontal transverse section taken on the line 10—10 of Fig. 8; and Fig. 11 is a perspective view of a trunnion-slide member forming part of a fulcrum employed in this invention.

Figure 1:
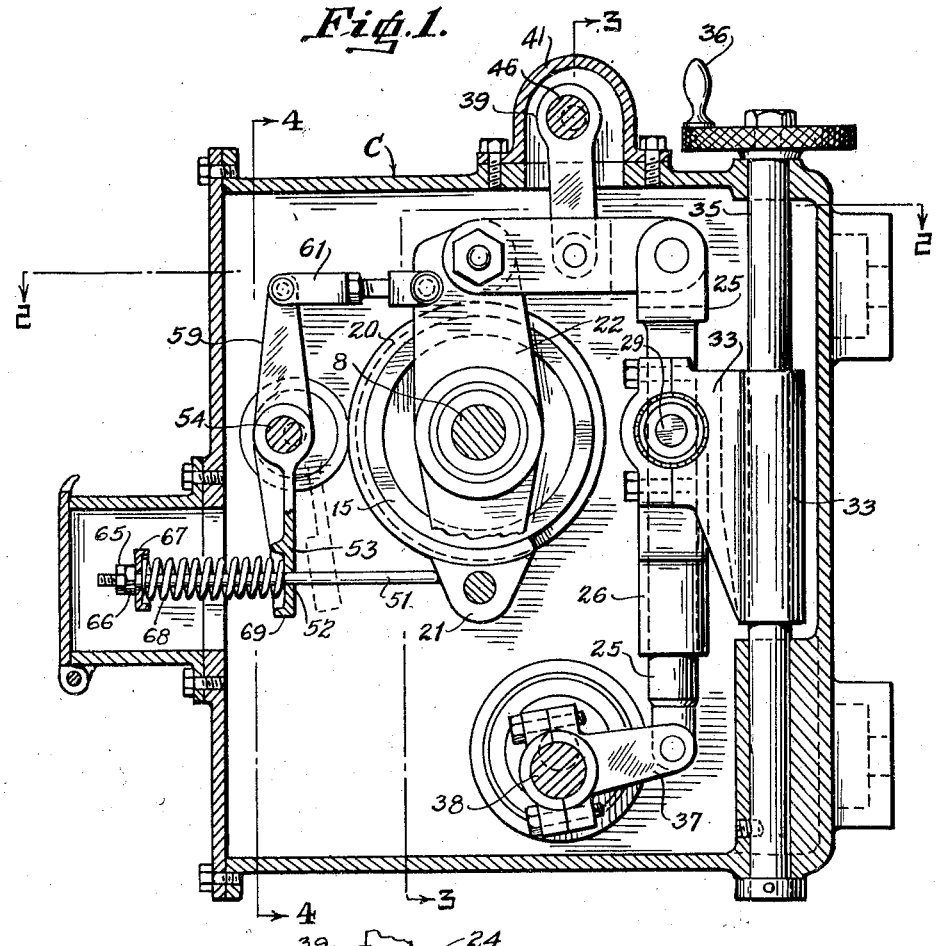
Fig. 1 is a vertical section of a speed reducer taken on the line 1—1 of Fig. 2.
Figure 2:
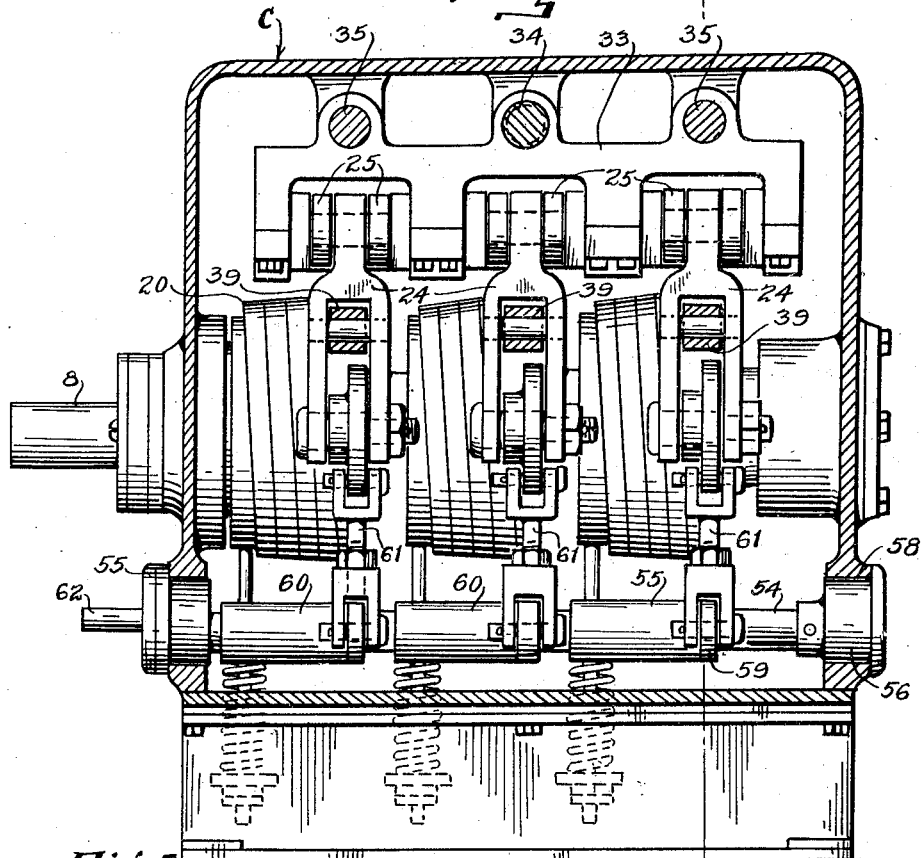
Fig. 2 is a horizontal section taken on the line 2—2 of Fig. 1.

In the drawings (see particularly Figs. 1 and 3) the reference numeral 1 designates a crank shaft, which will hereafter be referred to as the driver shaft, since it is intended to be connected up for rotation directly to the prime mover. The details for connecting this driver shaft 1 to the prime mover form no part of the present invention and are not described herein.

The driver shaft 1 is journaled in suitable bearings 2 and 3 mounted in the opposite end walls 4 and 5 of an oil-tight casing in which the speed reducing mechanism is enclosed. As shown clearly in Fig. 3 the end wall 5 is detachably secured to the top 6 and bottom 7 of the casing for the purpose of facilitating assembly of the several parts of the invention and their renewal and repair when necessary.

The driven shaft 8 is journaled in ball bearings 9 and 10 in the end walls 4 and 5, respectively, of the casing, which is designated generally in the drawing by the reference character C. As shown clearly in Fig. 3 the crank shaft 1 is provided with three throws 11, 12 and 13, spaced apart lengthwise of the shaft 1 and angularly arranged at an angle of 120° to each other.

Directly opposite to the crank throws 11, 12 and 13, the driven shaft 8 has cylindrical drums 14, 15 and 16, suitably secured thereto; and spacers 17 and 18 are fixed to the said shaft 8 to separate the center drum 15 from the end drums 14 and 16. The right hand face of the end drum 16 is separated from the end wall 5 of the casing C by a spacer 19; while the left hand end of the drum 14 rotates closely adjacent to the end wall 4. These spacers are of the utmost importance in this invention, because they permit the introduction of rocker arms for coil grip driving means on each drum in such manner as to eliminate all possibility of breaking the coil grip by moving the ends thereof radially toward and from the drums.

The spacers 17, 18 and 19 also provide a bearing larger than the driven shaft 8 in order to attain a more desirable ratio between the diametrical and longitudinal or axial dimensions of the rocker arm bearing, and thereby reduce the tendency of the rocker arm to "wobble." These spacers also provide a construction in which the superficial area of the bearing surfaces of the rocker arms involved is reduced to the lowest practical minimum.

Each of the drums 14, 15 and 16 is provided with a coil grip 20, controlled in operation by linkage operably connected to the driver crank shaft 21. Since the operating mechanism for each drum and the coil grip thereon is identical, only one of these mechanisms will be described in detail, and the same numerals will be applied to identical parts in the drawings.

Referring particularly to Figs. 1 and 3, for disclosure of the drum operating mechanism, there is shown a coil grip 20 mounted on the center drum 15, and wound spirally from one end of the drum to the other. The coil grip 20 is wound in coil spring fashion around a drum about two-one-thousandths of an inch larger diameter than the drum 15, in order that the coil grip 20 may remain normally loose and out of contact with the periphery of the drum 15 when the parts are assembled.

In the manufacture of the coil grip 20 a strip of metal of which it is formed is of the same cross-sectional area throughout. This means that both inner and outer surfaces of the cylinder formed by this strip are parallel and cylindrical. The outer face is then turned down to form the surface of the frustrum of a cone, thereby forming smooth inner and outer faces of the coil grip, and, at the same time, providing the most desirable taper lengthwise of the coil grip found necessary to impart the maximum gripping properties to the coil grip consistent with the strength thereof required for efficient and continuous operation.

It is to be particularly noted that the coil grip from end to end remains parallel to the drum 15; and the operating connections to the grip are so arranged as to maintain this parallelism and to prevent anything in the nature of radial movement of the ends of the coil grip from the drum 15. To obtain this desirable restriction in the movements of the ends of the coil grip, the large end of said coil grip has a lug 21 welded or otherwise secured thereto, as shown in Fig. 1. This lug 21 is pivoted to the lower end of a rocker arm 22 which is pivotally mounted on the spacer 18, a bushing 23 being interposed between the hub of said rocker arms and the spacer 18.

The upper end of the rocker arm 22 has one end of a link 24 pivoted thereto. The other end of the link 24 is pivoted to one end of a lever 25 which is slidably mounted in a fulcrum sleeve 26 (see Figs. 8 and 9). The sleeve 26 is bifurcated, at its upper end, and the furcations thereof 27 and 28 have trunnions 29 and 30 extending laterally therefrom to rotate in ball bearings 31 and 32 secured in a fulcrum plate 33, which is adjustable vertically in the casing C.

The fulcrum plate 33 extends along the back of the casing C, and is vertically bored to receive an adjusting screw 34, which is screwthreaded into the sleeve 33 to effect the aforesaid vertical adjustment. Since only one adjusting screw 34 is necessary, it is sufficient to provide the plate 33 with one or more guide rods 35 parallel to the adjusting screw 34 in order to guide the plate 33 vertically and prevent rotation thereof. This construction is clearly shown in Fig. 10. The upper end of the screwthreaded rod 34 extends through the top of the casing C and has secured thereto a handle 36 to facilitate rotation of the rod 34 and the vertical adjustment of the fulcrum plate 33.

Figure 6:
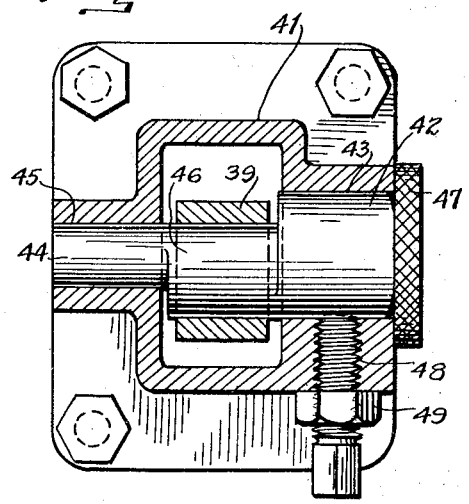
Fig. 6 is a horizontal section to an enlarged scale taken on the line 6—6 of Fig. 1.
Figure 7:
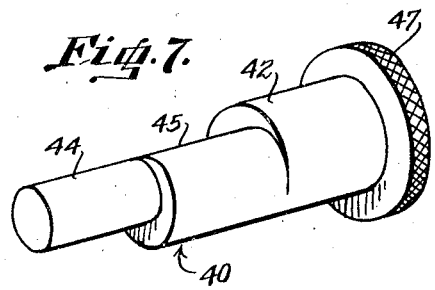
Fig. 7 is a perspective view of an eccentric supporting pivot for a link forming part of this invention.

The lower end of the lever 25 is pivoted to the end of a connecting link 37, which has its other end rotatably mounted on the crank throw 38 of the drive shaft 1. The linkage connecting the upper end of the rocker arm 22 with the crank throw 38, and comprising the link 24, lever 25 and link 37, is supported from the top of the casing C by a link 39 having its lower end pivoted to the link 24, intermediate the ends thereof. This link 39 is adjustably mounted on the top of the casing C by means of a pivot 40 (see particularly Figs. 3, 6 and 7), rotatably mounted in a small casing 41 suitably secured to the top of the casing C. The pivot 40 comprises a cylindrical part 42 seated in a bore 43 of the casing 41; and this part 42 is connected to a smaller cylindrical part 44, seated in a bore 45, by an intermediate cylindrical member 46.

The axes of the parts 42 and 44 are coincident; and the axis of the intermediate cylindrical member 46 is parallel to the said axes. The cylindrical member 46 is larger in diameter than the diameter of the part 44, but smaller than that of the part 42, and forms an eccentric pivot for the upper end of the link 39. The adjustment of this eccentric pivot 46 is effected by means of the thumb wheel 47; and this pivot 46 is locked in an adjusted position by means of a set screw 48 extending through a side of the casing 41 and locked thereto by means of the lock nut 49.

The adjustable restraining link 39 is designed to prevent lateral movement of the floating links 24 and 37 and the lever 25, except within limits determined by the designer to be the irreducible minimum of such movement. The function of this restraining link is to make it possible for the operator to maintain a constant ratio between the oscillating movements of the ends of the lever, which ratio might, after initial set-up of the device, become prejudicially changed because of wear, vibration or other fortuitous factors.

In order to effect the gripping of the coil 20 on the drum 15, the thin end of the coil 20 is provided with a lug 50 welded to, or otherwise suitably secured to the said thin end. A rod 51 has one of its ends pivoted to the said lug 50 and this rod passes through an aperture 52 in the lower arm 53 of a rocking lever, which is rotatably mounted, intermediate its ends, on a shaft 54. This shaft 54 is secured eccentrically to journals 55 and 56, seated in bearings 57 and 58, respectively, formed in the opposite walls of the casing C.

The upper arm 59 is laterally off-set from the arm 53 on the hub 60, which constitutes a sleeve rotatable on the shaft 54; and the free end of the arm 59 is pivotally connected to a turnbuckle link 61, one part of which is pivotally connected to the upper end of the rocker arm 22. A crank handle 62 secured to one end of the shaft 54 (see Fig. 4) is rotatable between stops 63 and 64 in order to rotate the shaft 54 from the position shown by full lines in Fig. 1 to that shown by dotted lines in the same Fig. 1, and vice versa.

The rod 51 (see Fig. 1) is a floating rod supported by the lower arm 53 of the rocking lever; and this rod projects through the said lower arm and is screwthreaded at one end to receive the locking and adjusting nuts 65 and 66. A cylindrical cup 67 is seated on the rod 51 against the adjusting nut 66, and a compressing spring 68 surrounds this rod 51 and has one end seated in the cup 67. The other end of the spring 68 seats in a cup 69 formed on one face of the lower end of the arm 53.

In the initial set-up of the device, the turnbuckle link 61 is adjusted to compress the spring 68, and thereby cause the rod 51 to pull the lower thin end of the coil grip 20 toward the left hand end of the casing, as seen in Fig. 1. This causes the rod 51 to pull in the direction opposite to rotation of the drum. The tightening action of the lever 25 and link 24 through the medium of the rocker shaft of the rocker arm 22 moves the lower thick end of the coil 20 in the direction of rotation of the drum.

When the rocker arm 22 moves in the direction opposite to the rotation of the drum, it exerts a loosening force upon the coil 20, this counter-rotation being further assisted by the action of the spring 68 exerting a tensional force in the direction of counter-rotation, thereby permitting the drum to revolve freely within the released coil. It will thus be apparent that a continuous uniform motion of the driven shaft 8 in the desired direction is maintained by the successive embracing and releasing action of the respective drums by the respective coils in predetermined sequence.

It will be seen from the drawings that since the angular movement of the rocker arm 22 is exactly the same as the angular movement of the arms 53 and 59 and of the coil 20, their respective velocities will be the same; hence, there will be no tightening nor relaxing of the spring 68, the length of which, except when thrown into a neutral position, will remain the same. Thus, it will be appreciated, that during the operation of the tightening of the coil 20 upon its drum, the spring 68 will be exerting a force upon the rod 51 in a direction opposite to that causing the tightening action; while, during the operation of the loosening of the coil upon the drum, this spring 68, while not altering its length nor degree of tension, will be exerting a force in a direction the same as that which is causing the loosening of the coil, thereby assisting this loosening function.

It will be readily apparent that the reaction force of the spring 68 subtracts nothing from the applied useful force actuating the coil 20. For example; if the tension coil or spring 68 is exerting a force of, say, five pounds in a direction opposite to the direction of rotation of the coil, and at the small end of the coil, it will be simultaneously exerting through the medium of the rocker arm 22, an equal force in the direction of rotation on the opposite end of the coil 20, thereby balancing the forces.

The actuating coil 20 is brought into idling position by turning its eccentrically mounted shaft 54, so as to move the arm 53 into the dotted line position shown in Fig. 1 to release all pressure upon the spring 68, and thereby release the grip of the coil 20 upon its drum 15.

It must be understood that the several coils act upon their respective drums, so that their rotating forces overlap to keep the driven shaft 8 into continuous rotary movement. It will be obvious, of course, that the more drums and coils there are, the more closely can their rotary effect be overlapped so as to keep the speed of rotation of the shaft 8 substantially constant.

It will apparent, particularly from Fig. 1 of the drawing, that the duration of grip of the coils upon their respective drums may be varied by rotation of the handle 36 in order to vary the position of the fulcrum plate 33, and thereby vary the throw of the link 24 by the lever 25 in its coil gripping and releasing operation.

The several parts of the casing will be designed so as to give ready access to the interior thereof in assembling the several parts of the speed reducing mechanism, but this is a matter which can be readily attended to by any person skilled in the art; and the details of the casing are, therefore, not specifically described nor claimed.

What I claim is:

1. A variable speed transmission comprising a support, a crank shaft journaled in said support, a driven shaft having a drum fixed thereto, a coil grip spirally wound around said drum, means rotatably mounted on said driven shaft to support one end of said coil grip at a fixed radial distance from the periphery of said drum, yielding means pivotally mounted on said support and connected pivotally to the other end of said coil grip to resist rotation of the grip as a whole around said drum, and means connecting the crank shaft to the first named means to effect intermittent gripping of the drum by said coil grip in one direction only.

2. A variable speed transmission comprising a driven shaft having a drum fixed thereto, a coil grip spirally wound around said drum, means for normally supporting said coil grip out of gripping contact with said drum and with one end at a fixed radial distance from said drum, and mechanism for moving said means to cause intermittent gripping contact of said coil grip with said drum.

3. A variable speed transmission comprising a driven shaft having a plurality of drums fixed thereto and axially spaced from each other, a rocker arm for each drum rotatably mounted on said shaft and closely adjacent to the end of said drum, a coil grip on each drum and having one end pivotally connected to the adjacent rocker arm at a fixed distance from the axis of said drum, yielding means pivotally connected to the other end of each coil grip to resist rotation of the coil grip as a whole by said rocker arm, and means for oscillating said rocker arms successively to effect successive gripping of the several drums in one direction to effect continuous rotation of said driven shaft.

4. A variable speed transmission including a driven shaft having a drum fixed thereto, a driver crank shaft, a coil grip spirally wound around said drum, a rocker arm rotatably mounted on said driven shaft adjacent one end of said drum and having one end thereof pivotally connected to one end of the coil grip to support said end at a fixed radial distance from the axis of said driven shaft, yielding means connected to the other end of said coil grip to resist rotation of the grip as a whole by said rocker arm, a support for said shaft, a lever of the first class having a fulcrum adjustable on said support, a link pivotally connecting one end of said rocker arm to one end of said lever, a link pivotally to the other end of said lever to the crank throw of said crank shaft, and means for supporting the first named link to swing relative to said support.

5. A variable speed transmission comprising a driven shaft having a drum fixed thereto, a coil grip spirally wound around said drum, a rocker arm rotatably mounted on said driven shaft adjacent one end of said drum and having one end thereof pivotally connected to one end of the coil grip to support said end at a fixed radial distance from the axis of said driven shaft, means connected to the other end of said coil grip to resist rotation of the grip as a whole by said rocker arm, a support for said shaft, a lever having a fulcrum adjustable between its ends on said support, a link pivotally connecting one end of said rocker arm to one end of said lever, a link having one end pivotally connected to said support and having its other end pivoted to the first named link to restrain the oscillatory movements thereof, and means pivotally connected to the other end of said lever for rocking the same about its fulcrum to effect intermittent gripping of the drum by the said gripping coil.

6. A variable speed transmission including a driven shaft provided with a drum, a coil grip wound around said drum, means for holding one end of said grip at a fixed radial distance from the axis of said drum and yielding means connected to the other end of said coil grip to resist rotation of the coil grip as a whole in either direction around said drum.

7. A driving shaft, a driven shaft, a linkage pivotally connected to each of said shafts to impart rotation from the driving to the driven shaft, one of the links of said linkage being a lever of the first class, means for adjusting the fulcrum for said link to vary the speed of rotation imparted to said driven shaft by said driving shaft, and means for restraining the movements of said linkage during the rotation imparting operation thereof.

In testimony whereof I affix my signature.

JOHN M. MANN.